(12) United States Patent
Haufe et al.

(10) Patent No.: US 8,639,992 B2
(45) Date of Patent: Jan. 28, 2014

(54) SOFT ERROR RATE DETECTOR

(75) Inventors: Christian Haufe, Dresden (DE); Jens Pika, Bautzen (DE); Jörg Winkler, Ullersdorf (DE)

(73) Assignee: Globalfoundries, Inc., Grand Cayman (KY)

( * ) Notice: Subject to any disclaimer, the term of this patent is extended or adjusted under 35 U.S.C. 154(b) by 268 days.

(21) Appl. No.: 13/108,721

(22) Filed: May 16, 2011

(65) Prior Publication Data

US 2012/0297259 A1  Nov. 22, 2012

(51) Int. Cl.
*G06F 11/00* (2006.01)
*G01R 31/28* (2006.01)

(52) U.S. Cl.
USPC .......................................... 714/704; 714/726

(58) Field of Classification Search
USPC .......... 714/704, 705, 724, 725, 718, 721, 6.1, 714/6.11, 6.2, 42, 707, 726, 727, 729, 731, 714/30; 365/200, 201
See application file for complete search history.

(56) References Cited

U.S. PATENT DOCUMENTS

| 5,043,986 | A * | 8/1991 | Agrawal et al. | 714/736 |
|---|---|---|---|---|
| 6,944,804 | B1 * | 9/2005 | Kim et al. | 714/704 |
| 7,523,371 | B2 * | 4/2009 | Mitra et al. | 714/729 |
| 8,145,959 | B2 * | 3/2012 | Mims et al. | 714/718 |

* cited by examiner

*Primary Examiner* — Christine Tu
(74) *Attorney, Agent, or Firm* — Ingrassia Fisher & Lorenz, P.C.

(57) ABSTRACT

The soft error rate (SER) detector circuit presented here can be used to measure SER in combinatorial logic devices caused by radiation. The SER detector circuit includes a plurality of detector arrays coupled in series, and each having a plurality of SER test structures coupled in series. Each of the SER test structures includes a plurality of detector elements coupled in series. Each of the SER test structures is configured to detect single event transients (SETs) in a first operating mode and single event upsets (SEUs) in a second operating mode. The SER detector circuit also has control logic elements to control operation of the plurality of detector arrays.

15 Claims, 8 Drawing Sheets

| COUNTER VALUE | MEANING |
|---|---|
| 16'b0000_0000_0000_0000 | 0 SETs DETECTED |
| 16'b0000_0000_0000_0001 | 1 SET DETECTED |
| 16'b0000_0000_0000_0011 | 2 SETs DETECTED |
| 16'b0000_0000_0000_0111 ... 16'b0011_1111_1111_1111 | 3 ... 14 SETs DETECTED |
| 16'b0111_1111_1111_1111 | 15 SETs DETECTED |
| 16'b1111_1111_1111_1111 | 16 OR MORE SETs DETECTED (OVERFLOW) |
| 16'bxxxx_xxxx_xxxx_xx10<br>16'bxxxx_xxxx_xxxx_x10x<br>16'bxxxx_xxxx_xxxx_10xx<br>16'bxxxx_xxxx_xxx1_0xxx<br>16'bxxxx_xxxx_xx10_xxxx<br>16'bxxxx_xxxx_x10x_xxxx<br>16'bxxxx_xxxx_10xx_xxxx<br>16'bxxxx_xxx1_0xxx_xxxx<br>16'bxxxx_xx10_xxxx_xxxx<br>16'bxxxx_x10x_xxxx_xxxx<br>16'bxxxx_10xx_xxxx_xxxx<br>16'bxxx1_0xxx_xxxx_xxxx<br>16'bxx10_xxxx_xxxx_xxxx<br>16'bx10x_xxxx_xxxx_xxxx<br>16'b10xx_xxxx_xxxx_xxxx | COUNTER VALUE CORRUPTED |

SOFT ERROR RATE DETECTOR

TECHNICAL FIELD

Embodiments of the subject matter described herein relate generally to semiconductor devices. More particularly, embodiments of the subject matter relate to a semiconductor-based test structure for detecting soft errors induced by radiation.

BACKGROUND

Semiconductor devices, fabrication processes for manufacturing semiconductor devices, and associated test circuits and test structures are well known. On-chip test architectures are often used to check certain characteristics of a semiconductor device (such as a device that implements combinatorial or sequential logic) manufactured by a particular process. In this regard, the on-chip test structure is fabricated using the proposed manufacturing process, and with standard circuit modules, cell libraries, and the like. Consequently, the on-chip test structure can be exposed to controlled test conditions (e.g., temperature, radiation, electromagnetic interference) to determine how other devices fabricated in accordance with the same process technology might react to the same conditions.

Exposure of integrated circuits to nuclear radiation can trigger soft errors (radiation-induced misbehavior). Radiation-induced soft errors are usually categorized as single event transients (SETs) or single event upsets (SEUs). An SET represents a transient change in bit state, while an SEU represents a relatively persistent change in bit state. One conventional soft error detection scheme uses random access memory structures to measure the critical amount of charge needed to flip a bit (Qcrit). Another known technique uses flip-flop chains to measure Qcrit. Existing approaches, however, utilize different test structures or test devices to measure SETs and SEUs. Consequently, such existing solutions are inefficient and costly.

Accordingly, it is desirable to have an efficient and effective semiconductor-based test structure that can detect both SETs and SEUs. Furthermore, other desirable features and characteristics will become apparent from the subsequent detailed description and the appended claims, taken in conjunction with the accompanying drawings and the foregoing technical field and background.

BRIEF SUMMARY

An exemplary embodiment of a soft error rate (SER) detector circuit is presented herein. The SER detector circuit includes a plurality of detector arrays coupled in series, where each detector array has a plurality of SER test structures coupled in series. Each of the SER test structures includes a plurality of detector elements coupled in series, and each of the SER test structures is configured to detect single event transients (SETs) in a first operating mode and single event upsets (SEUs) in a second operating mode. The SER detector circuit also includes control logic elements to control operation of the plurality of detector arrays.

Also provided is an exemplary embodiment of an SER detector circuit fabricated on a semiconductor substrate in accordance with a semiconductor fabrication process. The SER detector circuit includes a combined SER test structure configured to detect both SETs and SEUs. The SER detector circuit has a persistent output state for detection of SETs.

An exemplary embodiment of an SER test structure is also presented. The SER test structure includes a detector chain having an input and an output, and an edge detector having an input and an output. The input of the edge detector is coupled to the output of the detector chain. The edge detector distinguishes non-recordable signal transitions from the detector chain from recordable signal transitions that are indicative of SETs. The SER test structure also includes a capture/hold element having an input and an output. The input of the capture/hold element is coupled to the output of the edge detector. The capture/hold element changes state in response to the edge detector detecting a recordable signal transition that is indicative of a SET, and the capture/hold element retains its state until reset. The SER test structure also includes a counter having an input and an output. The input of the counter is coupled to the output of the capture/hold element, and the counter maintains a count associated with detection of SETs.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 9 is a table of exemplary counter values and their meaning in the context of an SER test structure.

DETAILED DESCRIPTION

Figure 1:
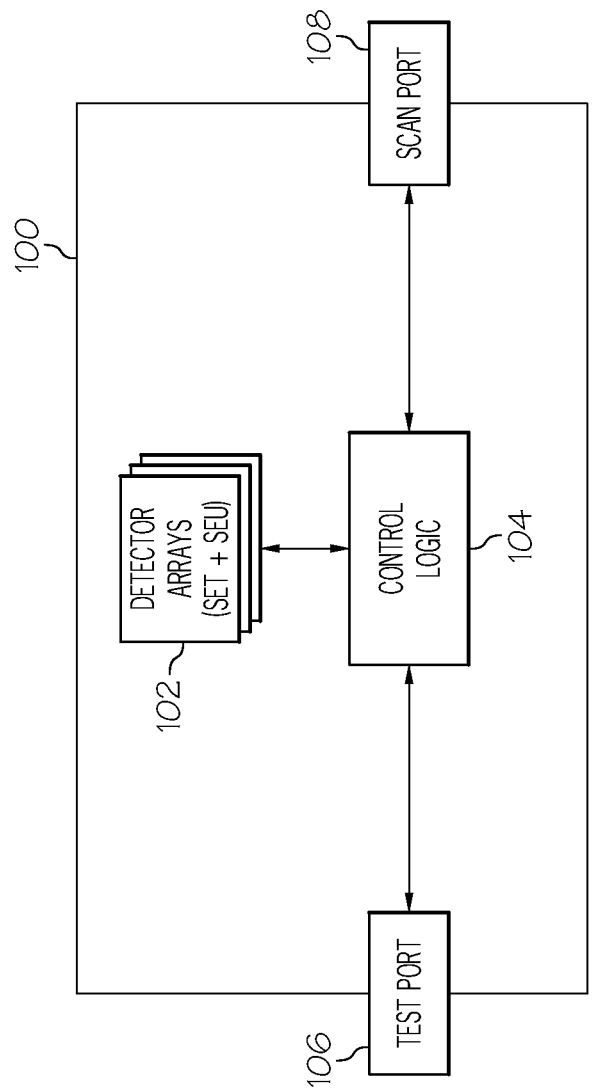
FIG. 1 is a schematic block diagram representation of an exemplary embodiment of a soft error rate (SER) detector circuit.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented here relates to a semiconductor-based test device designed to detect and measure soft errors (e.g., soft error rate or SER), such as those induced by radiation, whether externally applied radiation or "internally" applied radiation caused by materials and elements of the device itself The test device leverages scanning techniques where a known string of bits (the digital input) is fed into the test device, resulting in a string of output bits (the digital output) that is determined by the known and expected logic function of the test device. Thus, if the elements that perform the logic function are operating in an error-free manner as expected, the known digital input will generate a predictable and known digital output. In contrast, the presence of any soft errors will result in a different string of output bits, which can be analyzed to determine the cause and severity of the errors.

To qualify a semiconductor device manufacturing process or a standard cell library for production of products with high reliability requirements (i.e., medical equipment, server central processing units, networking tools, military and astronautic applications), the susceptibility to soft errors of the manufacturing process or the standard cell library has to be determined. Soft errors of the type addressed here are changes/fluctuations of the charge or voltage levels caused by exposure to ionizing radiation such as nuclear radiation, cosmic radiation, or the natural radiation of the manufactured product itself. The smaller the device features are, the higher is their susceptibility to radiation. Accordingly, as process technology continues to progress (with decreasing size of design structures and increasing design integration density), the importance of the impact of SER is growing.

The SER detector circuit presented here is implemented as a combined design to measure the SER for single event transients (SETs) and single event upsets (SEUs) in standard cell logic. Notably, the SER detector circuit can detect both SETs and SEUs using the same circuit architecture (operating in different modes). A single event transient is characterized by a pulse or glitch induced by radiation where the voltage level changes only temporarily and returns to its previous level. A single event upset is characterized by a radiation-induced persistent change of the voltage level such as a memory cell changing from one state to another state. In practice, the SER detector circuit is fabricated using the process technology intended for a production device, circuit, or product. Thereafter, the SER detector circuit is exposed to radiation and scan tested for SER.

The SER detector circuit can be implemented entirely with standard cell designs and can be easily adapted to new manufacturing processes and standard cell libraries. For easy implementation, the SER detector circuit can be implemented using standard automated place and route (SAPR) techniques. In certain embodiments, the SER detector circuit utilizes only the lower metal layers (M1-M3) to allow the circuit to be used for testing and qualification early in the production process. In addition, the SER detector circuit presented here can be used to characterize the susceptibility of semiconductor process technology to soft errors in both combinatorial and sequential logic architectures.

Referring now to the drawings, FIG. 1 is a schematic block diagram representation of an exemplary embodiment of a soft error rate (SER) detector circuit 100. The circuit 100 is realized as a semiconductor device fabricated on a semiconductor substrate using an appropriate manufacturing process. This particular embodiment generally includes, without limitation: one or more detector arrays 102 (typically a plurality of detector arrays 102); control logic elements 104 coupled to the detector arrays 102; a test port 106 coupled to the control logic elements 104; and a scan port 108 coupled to the control logic elements 104.

Although any number of detector arrays 102 could be used (including only one), an exemplary embodiment of the circuit 100 includes twelve detector arrays 102 arranged in parallel or in series. The detector arrays 102 may be identical to one another and fabricated to be distributed across the area of the semiconductor substrate without overlapping one another. This distributed arrangement facilitates effective and efficient radiation of the detector arrays 102. In certain embodiments, the detector arrays 102 are designed to accommodate a single scan chain (i.e., one and only one serial stream of scanning bits). The control logic elements 104 are responsible for controlling the operation of the detector arrays 102, regulating the scan input/output for the SER detector circuit 100, and the like.

In practice, a single scan chain may be employed to reduce the pin count of the resulting test chip. However, implementations with multiple scan chains are possible and are contemplated by this description. Use of multiple scan chains may be desirable in certain applications to reduce scan shift times at the expense of increased pin count.

The scan port 108 represents the physical and electrical connection(s) utilized for communication of the input and output scan chains. As schematically depicted in FIG. 1, the control logic elements 104 may serve as an intermediary between the scan port 108 and the detector arrays 102. The test port 106 represents the physical and electrical connection (s) utilized for testing of the chip on which the SER detector circuit 100 resides. For example, the test port 106 may provide supply voltage, ground, test signal, and control signal connections for the chip. In certain embodiments, the test port 106 is implemented as a Joint Test Action Group (JTAG) port.

The SER detector circuit 100 may be used to check for alpha radiation effects by connecting it to the test system, resetting the internal memory to a known state, and exposing the circuit 100 to alpha radiation. During radiation exposure, the chip may be connected to power, ground, and a suitable input stimulus via the scan port 108. The scan may be performed during the application of radiation, or it could be performed after the radiation is applied. The SER detector circuit 100 may also be used to check for neutron radiation induced soft errors. For neutron radiation specific testing, scanning is performed during the radiation exposure process, due to cost and other practical factors. In practice, any number of test chips can be connected in series and/or in parallel, radiated, and read while the neutron radiation is being applied.

Figure 2:
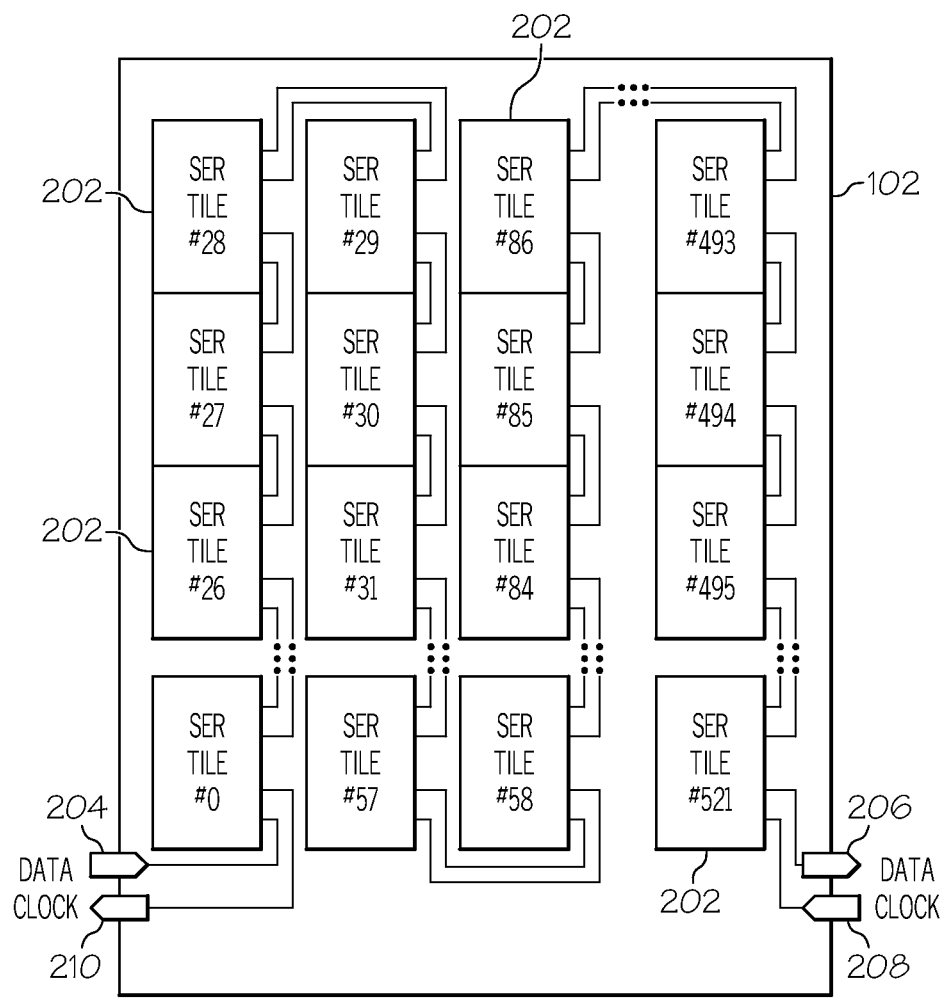
FIG. 2 is a schematic block diagram representation of an exemplary embodiment of a detector array suitable for use in the SER detector circuit shown in FIG. 1.

FIG. 2 is a schematic block diagram representation of an exemplary embodiment of a detector array 102 suitable for use with the SER detector circuit 100. As mentioned previously, the detector arrays 102 of the circuit 100 may be identical in configuration. Thus, the circuit 100 may include multiple instantiations of the detector array 102 (e.g., twelve of them). This particular implementation of the detector array 102 includes a plurality of identical SER test structures 202 (also referred to herein as SER tiles). As described in more detail below, the SER test structures 202 are the elements that perform the SET and SEU detection. Accordingly, each SER test structure 202 may be considered to be a "combined" SER test structure that can detect both SETs and SEUs. The SER test structures 202 are coupled in series to form a chain architecture. As illustrated in FIG. 2, most of the physical area of the detector array 102 is occupied by the SER test structures 202. In practice, about 95% of the area of the detector array 102 is devoted to the SER test structures 202, which provides a good "target" for the test radiation. Indeed, for maximum design density, the SER test structures 202 preferably exhibit a rectangular floor plan with fed-through control signals such that the SER test structures 202 can be chained together in a tile-like structure as depicted in FIG. 2.

Although the detector array 102 can include any number of SER test structures 202, the exemplary embodiment described here includes 522 SER test structures 202 chained together. The chain arrangement accommodates the routing of clock and data signals throughout the SER test structures 202. In this regard, the detector array 102 includes a data input port 204, a data output port 206, a clock input port 208, and a clock output port 210. Referring again to FIG. 1, the ports for a given detector array 102 may communicate with the control logic elements 104 and/or with one or more neighboring detector arrays 102, as needed. The data input port 204 and the data output port 206 may be used to accommodate a scan enable signal, a counter enable signal, a scan clock signal, a test signal, a detect enable signal, and possibly other signals as needed to support the operation of the system (many of these signals are described below). Although not always required, this particular embodiment propagates the data and clock signals in opposite directions through the chain of SER test structures 202. In other words, the data input port 204 and the clock output port 210 are associated with the SER test structure 202 at one end of the chain, while the data output port 206 and the clock input port 208 are associated with the SER test structure 202 at the other end of the chain. During operation, each SER test structure 202 (other than the last one in the chain) routes control signals and data signals to the next SER test structure 202 in the chain. The control signals and data signals can be buffered at each SER test structure 202 (or elsewhere) as needed to maintain synchronization and timing for the detector array 102. For example, the enable and clock signals are buffered and applied simultaneously to all of the SER test structures 202, using known timing offset techniques.

Figure 3:
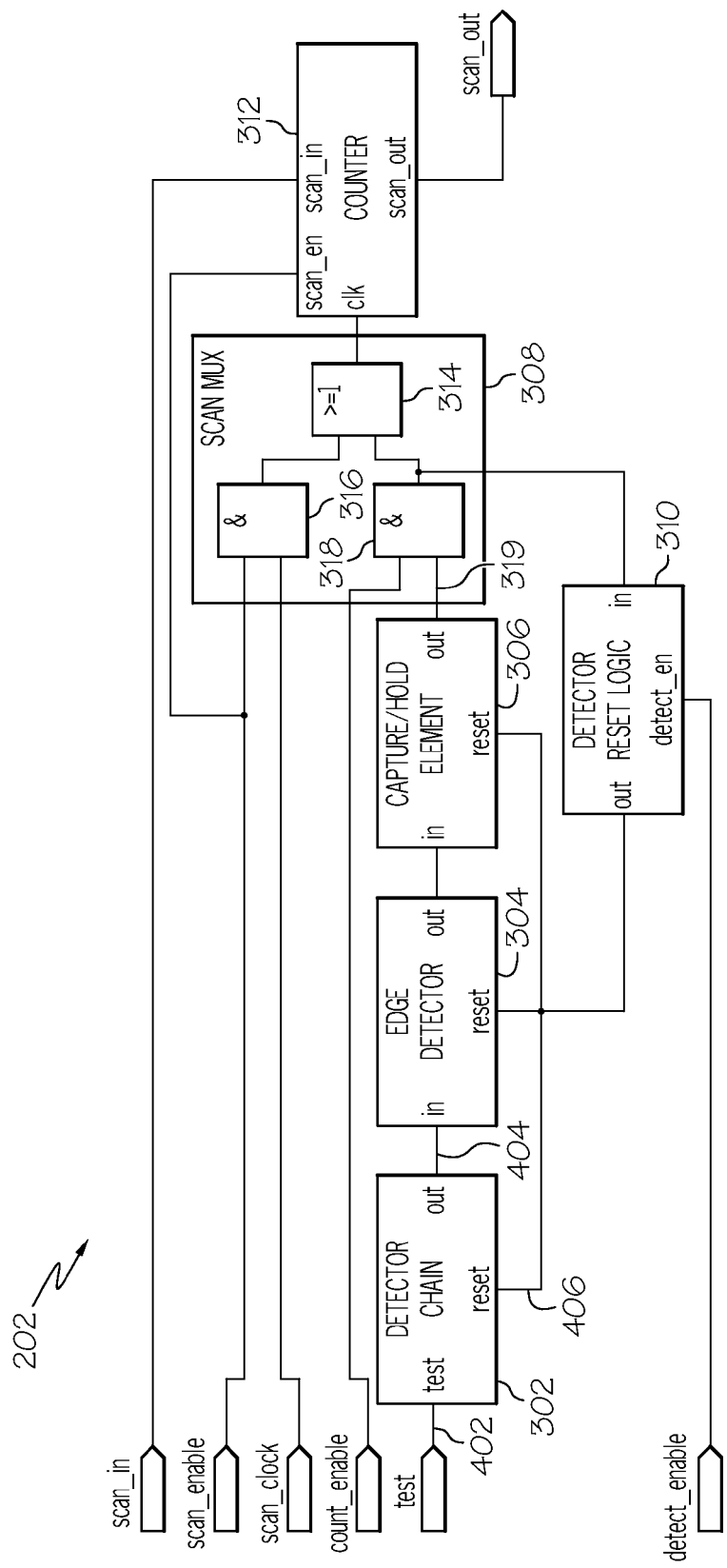
FIG. 3 is a schematic block diagram representation of an exemplary embodiment of an SER test structure suitable for use in the detector array shown in FIG. 2.

As mentioned above, the same basic design can be used for each of the SER test structures 202 in the SER detector circuit 100. In this regard, FIG. 3 is a schematic block diagram representation of an exemplary embodiment of an SER test structure 202 suitable for use in the SER detector circuit 100. This particular embodiment of the SER test structure 202 includes, without limitation: a detector chain 302; an edge detector 304; a capture/hold element 306; a scan multiplexer 308; detector reset logic 310; and a counter 312. The SER test structure 202 receives the following signals, data, or bits as inputs: Scan_In; Scan_Enable; Scan_Clock; Count Enable; Test; and Detect Enable. The testing and scanning operation and functionality of the SER test structure 202 is influenced by these inputs, and the SER test structure 202 generates Scan_Out as its digital output chain.

The Scan_Clock signal represents the shared clock that is propagated through all of the SER test structures 202 in each detector array 102 (see FIG. 2). For simplicity and clarity, FIG. 3 does not depict the structure or elements that are responsible for buffering and forwarding the Scan_Clock signal for use with other SER test structures 202. The remaining input signals and the Scan_Out signal depicted in FIG. 3 may be provided by the data input port 204 and the data output port 206 (see FIG. 2). For simplicity and clarity, FIG. 3 does not depict the structure or elements that are responsible for buffering and forwarding the Scan_Enable, Count_Enable, Detect Enable, and Test signals for use with other SER test structures 202. For ease of description, FIG. 3 stresses the functional elements and components of the SER test structure 202.

Figure 8:
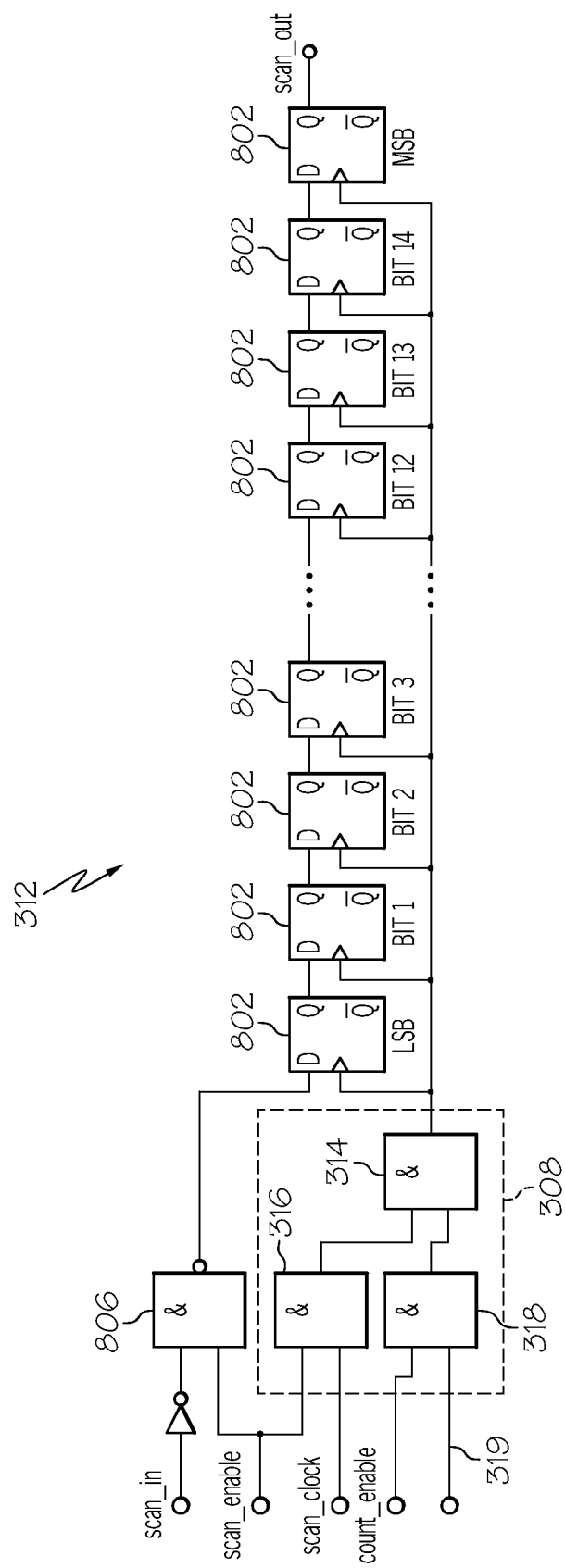
FIG. 8 is a schematic block diagram representation of an exemplary counter suitable for use in the SER test structure shown in FIG. 3.

The scan multiplexer 308 may be implemented in logic using an OR gate 314 and two AND gates 316, 318 arranged as shown in FIG. 3. The AND gate 316 receives the Scan_Enable and Scan_Clock signals as its two inputs, while the AND gate 318 receives the Count_Enable signal and the output 319 of the capture/hold element 306 as its two inputs. The outputs of the AND gates 316, 318 serve as the inputs to the OR gate 314. The output of the AND gate 318 also serves as the input to the detector reset logic 310. The output of the OR gate 314 represents the output of the scan multiplexer 308, which serves as the clock input to the counter 312. The counter 312 also receives the Scan_In signal as its scan input (under certain operating conditions), and generates the Scan_Out signal as is scan output. Referring also to FIG. 8, the Scan_In signal is provided as an input to an inverter or to an inverting input of a NAND gate 806, which may be considered to be part of the counter 312.

Figure 4:
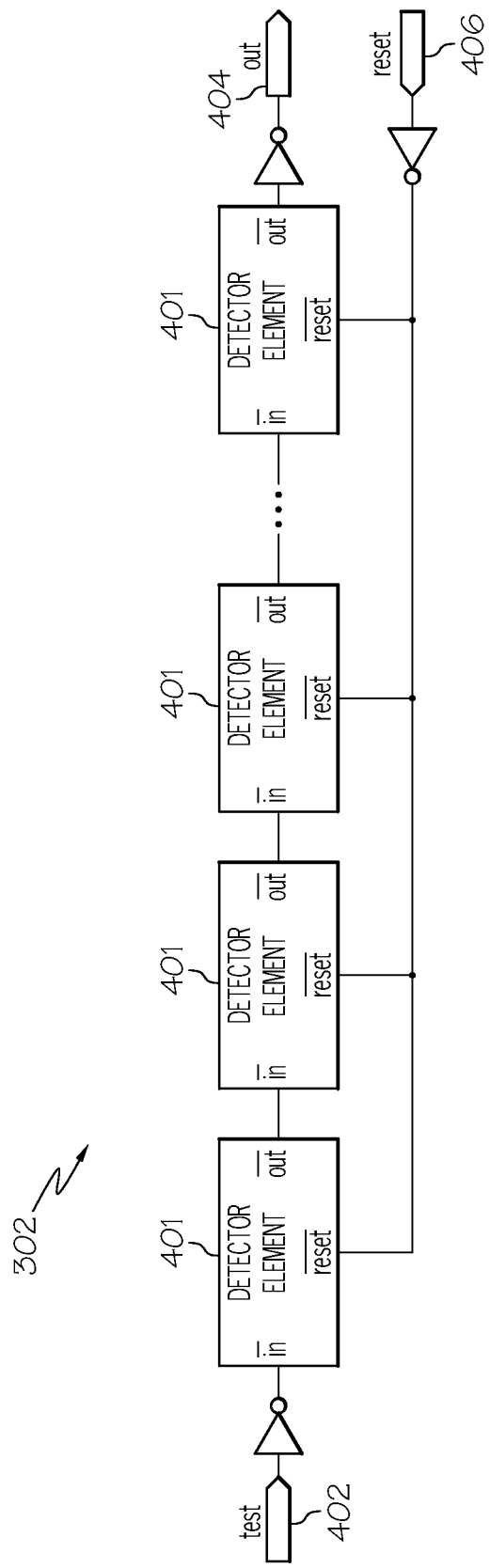
FIG. 4 is a schematic block diagram representation of a plurality of detector elements suitable for use in the SER test structure shown in FIG. 3.

The detector chain 302, edge detector 304, and capture/hold element 306 cooperate to perform SET detection with a persistent output state during a first operating mode of the SER test structure 202. The detector chain 302 obtains the Test signal as its test input, and generates an output that is indicative of a SET induced by radiation applied to the SER test structure 202. In this regard, the Test signal can be used to functionally test the asynchronous elements of the SER test structure 202 in order to detect manufacturing defects. The detector chain 302 may include one or more detector elements coupled in series. In certain embodiments, the detector chain 302 includes a plurality of detector elements chained together. In one particular implementation, the detector chain 302 includes 819 individual detector elements coupled together. In this regard, FIG. 4 is a schematic block diagram representation of one embodiment of the detector chain 302 suitable for use in the SER test structure 202. FIG. 4 depicts a plurality of detector elements 401 coupled together, a test input node 402 for the detector chain 302, an output node 404 for the detector chain 302, and a reset node 406 for the detector chain 302. These nodes 402, 404, 406 are also depicted in FIG. 3 for consistency. The reset node 406 accommodates a common Reset signal that is shared by all of the detector elements 401 in the detector chain 302. The Reset signal is used because each detector element 401 has a persistent output state that is indicative of a detected SET event, and that state will remain persistent until reset by the Reset signal.

The individual detector elements 401 form a chain that propagates detected SET events (from left to right in FIG. 4). For this exemplary embodiment, the detector chain 302 is reset by applying a logic low Reset signal from the detector reset logic 310. In response to a reset command, the detector elements 401 are reset to logic level low. As depicted in FIG. 3, the detector reset logic 310 may also be coupled to the edge detector 304 and to the capture/hold element 306 to control resetting as needed. When a logic level high Reset signal is applied, the detector elements 401 are ready for SET detection. When a SET has occurred, the altered detector element 401 that actually detects the SET as well as all detector elements 401 that follow the altered detector element 401 change their state to logic high level until they are reset to using the Reset signal. The Test signal can be used to induce a SET-like signal for testing purposes of the detector chain 302.

Figure 5:
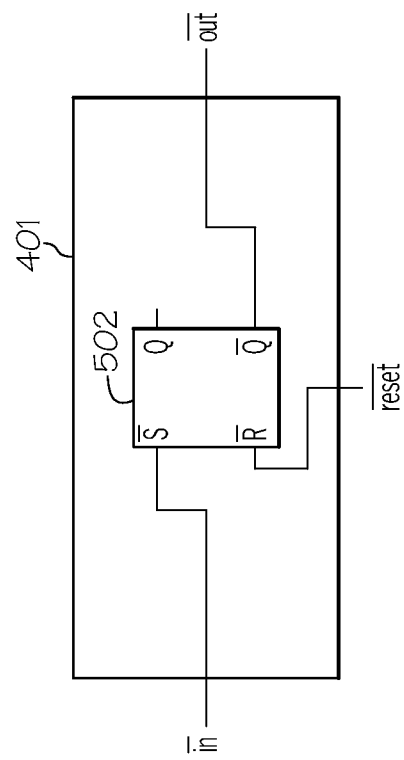
FIG. 5 is a schematic block diagram representation of an exemplary embodiment of a detector element suitable for use in the SER test structure shown in FIG. 3.

The detector chain 302 (either a single detector element or a plurality of series connected detector elements) occupies the largest part of the design area and is the actual target for the radiation. The detector chain 302 functions to detect radiation and to amplify any induced glitch or pulse. In accordance with one particular implementation, each detector element 401 is realized using NAND2 (i.e., two-input NAND) gates to form a set/reset (SR) latch. In this regard, FIG. 5 is a schematic block diagram representation of an exemplary embodiment of the detector element 401 suitable for use in the SER test structure 202. This detector element 401 is realized as an SR latch 502 formed from NAND2 logic elements corresponding to standard library cells (rather than from flip-flops). Such standard cell based NAND2 gates are particularly sensitive to neutron radiation, and hence are preferred for this application. Moreover, NAND2 gates represent combinatorial logic gates, which is desirable for modeling of the actual devices to be fabricated using the same process technology used to manufacture the SER test structure 202 itself. The $\overline{S}$ input, the $\overline{Q}$ output, and the $\overline{R}$ input of the SR latch 502 correspond to the respective inputs and output of each detector element 401 shown in FIG. 4.

Figure 6:
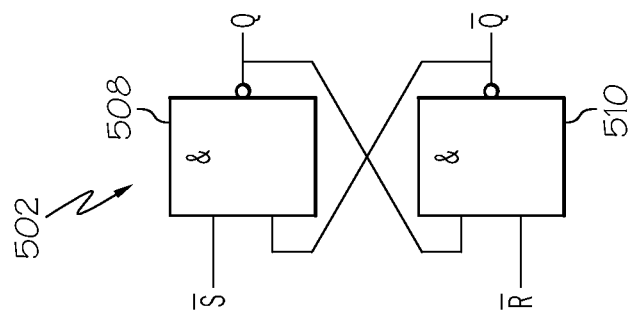
FIG. 6 is a schematic block diagram representation of an exemplary embodiment of a set-reset (SR) latch suitable for use as the detector element shown in FIG. 5.
Figure 7:
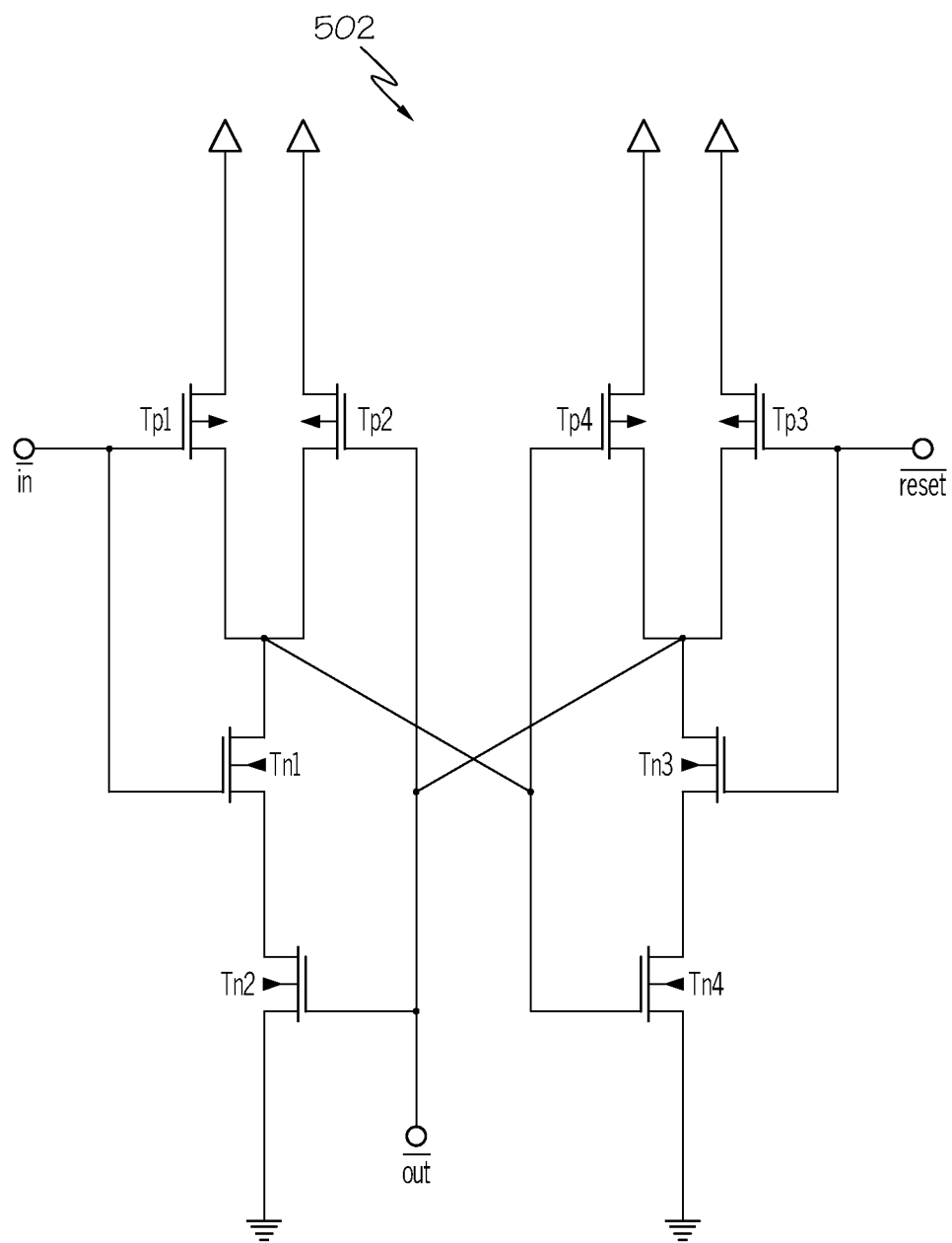
FIG. 7 is an electrical schematic of an exemplary embodiment of an SR latch.

FIG. 6 is a schematic block diagram representation of an exemplary embodiment of the SR latch 502, and FIG. 7 is an electrical schematic of an exemplary embodiment of the SR latch 502. FIG. 7 shows one practical implementation that includes eight transistors. As mentioned above, the SR latch 502 is formed from two NAND2 gates 508, 510. In practice, a SET affecting a NAND2 gate causes the SR latch 502 to change its state (thereby converting the SET into an SEU). As the SR latch 502 is bistable, it will not automatically return to its preceding value. Accordingly, the SET does not go undetected. Referring to FIGS. 4-7, when enabled (i.e., the Reset signal is set to logic low, which results in a logic high level at the inverted reset inputs of the detector elements 401), the detector element 401 changes state from low to high in response to either a SET occurring or upon reception of a propagated SET from its preceding detector element 401 in the detector chain 302. It should be understood that the NAND2-based SR latch 502 uses inverted set/reset pins and therefore inverted in/out pins. A NOR2-based detector element would use non-inverted pins.

The NAND2-based implementation is preferred due to its ratio of active area versus gate area when implemented in accordance with one exemplary standard cell library. The resulting SR latch 502 contains eight transistors (see FIG. 7), six of which can actively detect SETs. More specifically, the transistors labeled Tp3 and Tn3 in FIG. 7 cannot detect SETs because they are connected to the Reset signal.

Referring again to FIG. 4, as the detector chain 302 is formed from latches, there is no need to employ a capture/hold element at the end of the detector chain 302. If, however, the detector chain 302 is implemented using elements that do not change state after SET detection (e.g., inverter chains, NAND chains, or NOR chains), a final capture/hold element can be used to make the detected SET condition persistent. This "conversion" of SETs into a persistent state effectively transforms the SETs into SEUs for purposes of measurement and counting.

The output of the detector chain 302 is coupled to the input of the edge detector 304 (see FIG. 3). Thus, the persistent signal indicating SET detection will be sent to the edge detector 304. The edge detector 304 (which may also function as a pulse former) serves as a filter that filters pulses and transition "glitches" that are too small or minor to be considered as SETs. In other words, the edge detector 304 is used such that pulses that are actually indicative of a SET are determined and counted while disregarding pulses or glitches that may be caused by phenomena other than a SET. Stated another way, the edge detector 304 distinguishes non-recordable signal transitions from the detector chain 302 from recordable signal transitions that are indicative of SETs. In practice, the edge detector 304 may be implemented as a digital low pass filter that filters pulses that do not have at least a minimum pulse width, as is well understood. The edge detector 304 also forms signal transitions that are better suited for the counter 312.

In practice, the edge detector 304 takes the output of the last detector element 401 in the detector chain 302 and sends it through a chain of inverters or delay elements. Thus, any change of the input to the edge detector 304 propagates through the chain of inverters and will be sampled at various points in the chain. If a high-to-low transition has been propagated through the chain of inverters, an output latch changes state to logic low. After propagation of a low-to-high transition, the output latch changes state to logic high. In this way, a digital low pass filter is established and glitches should not propagate to the counter 312.

The output of the edge detector 304 is coupled to the input of the capture/hold element 306 (in certain embodiments, the capture/hold element 306 is integrated with the edge detector 304 such that the capture/hold element 306 functions as a final stage of the edge detector 304). The capture/hold element 306 changes state when a SET has been detected in the detector chain 302 and has passed through the edge detector 304. In other words, the capture/hold element 306 changes state in response to the edge detector 304 detecting a recordable signal transition that is indicative of a SET, and the capture/hold element 306 retains its state until reset. The capture/hold element 306 holds its SET-indicative state for counting by the counter 312, and until the detector reset logic 310 initiates a reset.

The clock input to the counter 312 is coupled to the output of the capture/hold element 306 via the scan multiplexer 308. The counter 312, which is preferably implemented as a redundant counter, serves different purposes depending on the operating mode of the SER test structure 202. When the SER test structure 202 is operating in the SET detect mode, the counter 312 functions to count detected SET events (as determined by the edge detector 304). When the SER test structure 202 is operating in the SEU detect mode, the counter 312 itself functions as a detector such that signal corruptions (by nuclear radiation the counter is exposed to) can be reliably detected.

FIG. 8 is a schematic block diagram representation of an exemplary embodiment of the counter 312 suitable for use with the SER test structure 202. FIG. 8 also depicts the scan multiplexer 308 from FIG. 3. This particular implementation uses a common data path for scan operation and functional operation such that simple (and small in area) D type flip-flops 802 coupled in series can be used. The counter 312 may include or cooperate with a NAND gate 806 having the Scan_In signal and the Scan_Enable signal as inputs.

Redundancy and signal integrity are achieved by using a temperature scale signal encoding scheme (see FIG. 9). The example of FIG. 9 employs notation that resembles Verilog-compliant value notation, where <16'b> indicates a 16-bit binary number, and where <x> indicates a bit that may be any value (one or zero). This encoding scheme allows the counter 312 to tolerate some disturbances (due to radiation) without corrupting the actual count. The counter 312 is redundant in that it does not rely on each bit to maintain a continuous binary count. Instead, the counter 312 uses more bits than necessary to maintain the count. Accordingly, even if a bit is corrupted, the counter 312 will remain accurate, or the corruption is at least detectable. For this implementation, the counter 312 is preloaded using all zero bits via a scan operation. In response to each detected SET event, the counter value will be shifted from least significant bit (LSB) towards most significant bit (MSB) with LSB being set to logic high ("1") via the output of the NAND gate 806, as the Scan_Enable signal is set to logic low ("0").

In practice, redundancy in the counter 312 could be achieved in an alternative manner. For example, other ways to achieve redundancy may include, without limitation: redundant register bits (two or more flip-flops per bit); majority decisions inside the counter logic; auto-correcting corrupted counter values; and post-processing encoded counter values within test equipment.

As explained in more detail below, the counter 312 serves as an SEU detector element when the SER test structure 202 is operating in the SEU detect mode. In other words, the flip-flops 802 become the target for the radiation. An SEU in the counter 312 would appear in one or more of the flip-flops 802. It should be appreciated that in the SEU detect mode the counter 312 does not function as a "counter" per se and, therefore, is not "redundant." Rather, the counter 312 serves as a chain of flip-flops that are susceptible to changes induced by radiation.

Notably, the SER test structure 202 is capable of operating in two different detection modes: SET detect mode and SEU detect mode. The SER test structure 202 also supports a scan mode. For the SET detect mode, the detector chain 302 is the radiation target, and the counter 312 is used to count the detected SETs (as filtered by the edge detector 304). For the SEU detect mode, the detector chain 302 is disabled by keeping it in a reset state, and the counter 312 is the radiation target. The scan mode is used to reset or initialize the counter 312 by setting the Scan_Enable signal to a logic high level, setting the Count_Enable signal to a logic low level, and scanning in a desired counter value, such as all zeroes. The initial counter value is obtained from the Scan In signal, and the flip-flops 802 are clocked with the Scan_Clock signal. The scan mode is also used to read out the state of the counter 312 at the desired time. Due to the nature of the scan mode, reading out the counter 312 also implies writing new values to the counter 312 via the Scan_In signal.

When operating in the SET detect mode, the Scan_Enable signal is held at logic low to disable the counter scan mode and to render both the Scan_In signal and the Scan_Clock signal irrelevant. In this regard, the output of the AND gate 316 will be logic low, and the output of the NAND gate 806 (see FIG. 8) will be logic high during the SET detect mode. Moreover, the Count_Enable signal is held at a logic high level to enable the counter 312 to keep track of SET events as registered by the capture/hold element 306. Furthermore, the Detect_Enable signal is held at a logic high level to bring the detector chain 302 and other elements out of the reset state via the detector reset logic 310.

In the SET detect mode, the state of the scan multiplexer 308 is such that the output of the OR gate 314 (i.e., the clock input to the counter 312) corresponds to the output of the capture/hold element 306. Consequently, the counter 312 increments whenever the capture/hold element 306 indicates a detected SET event. Notably, the configuration of the SER test structure 202 allows the detector chain 302, edge detector 304, and capture/hold element 306 to remain active (for purposes of detecting SETs) while the counter 312 is being read and initialized. In other words, each of the plurality of SER test structures 202 is configured such that the count from the counter can be read while detecting SETs in the SET detect mode. This is possible because the time it takes to read out the counter 312 is very short compared to the time it usually takes for a neutron to cause a SET. This characteristics is beneficial because it eliminates "dead time" in the detector chain 302.

When operating in the SEU detect mode, the Scan_Enable signal is held at logic low to disable the counter scan mode and to render both the Scan_In signal and the Scan_Clock signal irrelevant. In this regard, the output of the AND gate 316 will be logic low, and the output of the NAND gate 806 will be logic high during the SEU detect mode. Moreover, the Count_Enable signal is held at a logic low level to disable the counter 312. Furthermore, the Detect_Enable signal is held at a logic low level in order to hold the detector chain 302 and other elements in the reset state. In the SEU detect mode, the counter 312 merely serves as a chain of flip-flops that are susceptible to radiation. Radiation can cause a flip-flop to change its state. Thus, the counter 312 can be checked (via the scan mode) during or after exposure to radiation to determine whether any flip-flops toggled in response to the radiation.

The scan multiplexer 308 is coupled to the counter 312 and is controlled in an appropriate manner to control operation of the counter to support the SET detect mode or the SEU detect mode, as mentioned above. The scan multiplexer 308 may also be controlled to accommodate operation of the SER test structure 202 in a scan mode to scan an initial counter value into the counter and/or to scan out test data generated via the Test signal 402 and the detector chain 302.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A soft error rate (SER) detector circuit comprising:
a plurality of detector arrays;
each of the plurality of detector arrays comprising a plurality of SER test structures coupled in series;
each of the plurality of SER test structures comprising:
   a plurality of detector elements coupled in series to form a detector chain,
wherein the detector chain has an output node;
   a counter comprising an input and a plurality of flip-flops coupled in series; and
   a scan multiplexer having an input coupled to the output node of the detector chain, and having an output coupled to the input of the counter, and configured to generate a multiplexer output that serves as a clock input of the counter, wherein the counter and the scan multiplexer are controlled to support a single event transient (SET) detect mode or a single event upset (SEU) detect mode of the SER detector circuit, wherein the detector chain serves as a radiation target and the counter is enabled to count SETs detected by the detector chain when the SER detector circuit is in the SET detect mode, and wherein the detector chain and the counter are disabled, and the plurality of flip-flops of the counter serve as the radiation target to detect SEUs, when the SER detector circuit is in the SEU detect mode; and control logic elements to control operation of the plurality of detector arrays.

2. The SER detector circuit of claim 1, wherein each of the plurality of SER test structures comprises a capture/hold element to maintain a state indicative of a detected SET event when the SER detector circuit is in the SET detect mode.

3. The SER detector circuit of claim 1, wherein each of the plurality of detector elements has a persistent output state indicative of a detected SET event when the SER detector circuit is in the SET detect mode.

4. The SER detector circuit of claim 1, wherein the detector chain in each of the plurality of SER test structures has a persistent output state indicative of a detected SET event.

5. A soft error rate (SER) detector circuit fabricated on a semiconductor substrate in accordance with a semiconductor fabrication process, the SER detector circuit comprising a combined SER test structure configured to detect single event transients (SETs) when operating in a SET detect mode and single event upsets (SEUs) when operating in an SEU detect mode, the SER detector circuit having a persistent output state for detection of SETs, and the SER test structure comprising:
a plurality of detector elements coupled in series to form a detector chain, wherein the detector chain has an output node;
a counter comprising an input and a plurality of flip-flops coupled in series; and
a scan multiplexer having an input coupled to the output node of the detector chain, and having an output coupled to the input of the counter, and configured to generate a multiplexer output that serves as a clock input of the counter, wherein the detector chain serves as a radiation target and the counter is enabled to count SETs detected by the detector chain when the SER detector circuit is in the SET detect mode, and wherein the detector chain and the counter are disabled, and the plurality of flip-flops of the counter serve as the radiation target to detect SEUs, when the SER detector circuit is in the SEU detect mode.

6. The SER detector circuit of claim 5, wherein the SER test structure comprises:
an edge detector coupled to an output of the detector chain to determine SETs in the detector chain; wherein
the counter counts a number of SETs determined by the edge detector.

7. The SER detector circuit of claim 6, further comprising detector reset logic coupled to the detector chain and to the edge detector, wherein the detector reset logic resets the detector chain and the edge detector.

8. The SER detector circuit of claim 7, wherein the scan multiplexer controls operation of the counter to support the SET detect mode or the SEU detect mode.

9. The SER detector circuit of claim 5, wherein each of the plurality of detector elements comprises a set/reset latch.

10. The SER detector circuit of claim 9, wherein the set/reset latch comprises NAND2 gates.

11. A soft error rate (SER) test structure comprising:
a detector chain having an input and an output, wherein the detector chain is configured to generate an output comprising signal transitions indicative of single event transients (SETs) when the SER test structure is operating in a SET detect mode;
an edge detector having an input and an output, the input of the edge detector coupled to the output of the detector chain, wherein the edge detector distinguishes non-recordable signal transitions from the detector chain from recordable signal transitions that are indicative of SETs when the SER test structure is operating in the SET detect mode;
a capture/hold element having an input and an output, the input of the capture/hold element coupled to the output of the edge detector, wherein the capture/hold element changes state in response to the edge detector detecting a recordable signal transition that is indicative of a SET when the SER test structure is operating in the SET detect mode, and wherein the capture/hold element retains its state until reset; and
a counter having a plurality of flip-flops coupled in series, an input, and an output, the input of the counter coupled to the output of the capture/hold element, wherein the counter maintains a count associated with detection of SETs when the SER test structure is operating in the SET detect mode; wherein:
the detector chain serves as a radiation target and the counter is enabled to count SETs detected by the detector chain when the SER test structure is operating in the SET detector mode;
the detector chain and the counter are configured to be disabled when the SER test structure is operating in a single event upset (SEU) detect mode; and
the plurality of flip-flops of the counter serve as the radiation target to detect SEUs when the SER test structure is operating in the SEU detect mode.

12. The SER test structure of claim 11, wherein the detector chain comprises a plurality of set/reset latches coupled in series.

13. The SER test structure of claim 11, further comprising a scan multiplexer coupled to the capture/hold element and to the counter, wherein the scan multiplexer is controlled to accommodate operation of the SER test structure in the SET detect mode the SEU detect mode.

14. The SER test structure of claim 13, wherein the scan multiplexer is controlled to accommodate operation of the SER test structure in a scan mode to scan an initial counter value into the counter.

15. The SER test structure of claim 11, wherein the counter is a redundant counter.

* * * * *